April 22, 1969     A. L. CLIFFGARD ET AL     3,440,518
VOLTAGE-TO-CURRENT CONVERTER FOR USE WITH MEASURING INSTRUMENTS
Filed Oct. 24, 1966
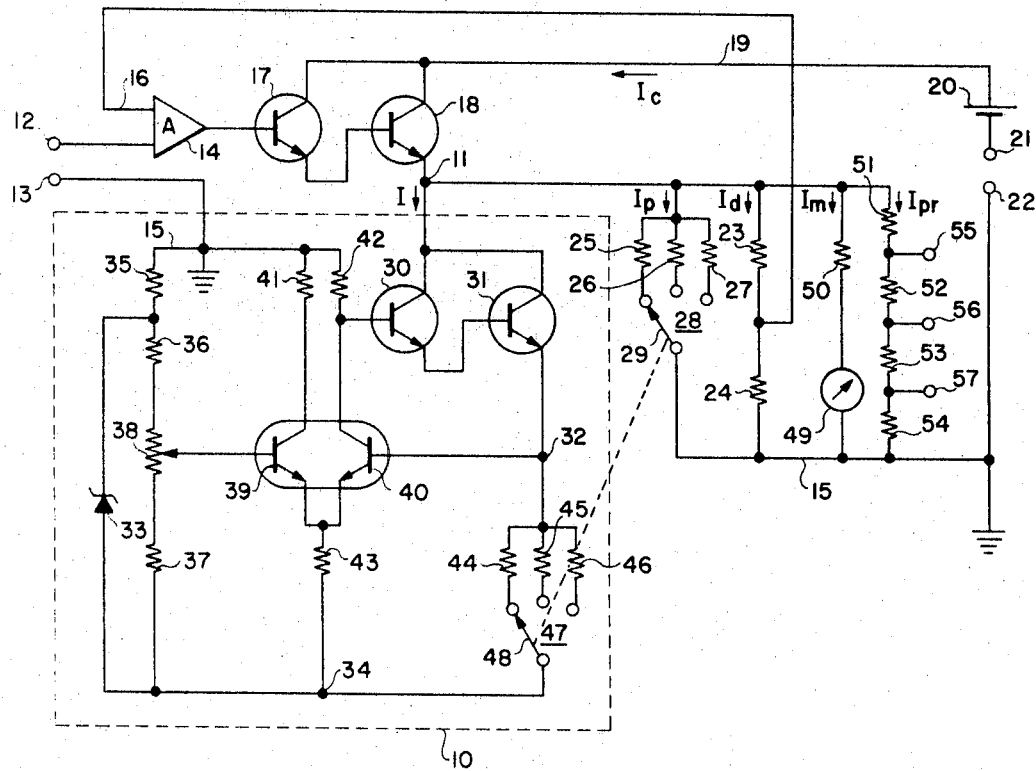
ARNIE L. CLIFFGARD
DAVID G. BOYNTON
*INVENTORS*
BY T E Kristofferson
ATTORNEY

United States Patent Office 3,440,518
Patented Apr. 22, 1969

3,440,518
VOLTAGE-TO-CURRENT CONVERTER FOR USE WITH MEASURING INSTRUMENTS
Arnie L. Cliffgard, Fountain Valley, and David G. Boynton, Whittier, Calif., assignors to Beckman Instruments, Inc., a corporation of California
Filed Oct. 24, 1966, Ser. No. 589,037
Int. Cl. G05f 1/44
U.S. Cl. 323—4
5 Claims

ABSTRACT OF THE DISCLOSURE

A voltage-to-current converter adapted to add a known controllable amount of offset current to the current proportional to the parameter being measured in such a converter. The input voltage signal to be measured is connected to the input of an operational amplifier connected to a Darlington emitter-follower transistor amplifier. The output of the amplifier is applied across a potential divider from which is taken the feedback for the operational amplifier. A constant current source is also connected to the output of the Darlington amplifier. If a current measuring meter or recorder is utilized, it is connected across the emitter-follower of the output stage of the Darlington configuration. Since the collector current flows through the recorder and is equal to the sum of the output currents from the Darlington amplifier and since the output of the amplifier is proportional to the input voltage minus the error voltage, the output current is likewise proportional thereto and has added thereto the offset current established by the constant current generator. By varying the constant current and the potential divider across the output of the amplifier proper scaling to the recorder is produced. Outputs are provided to different measuring instruments such as potentiometric recorders.

This invention relates to a universal instrument output circuit and, more particularly, to such a circuit adapted to insert a known controllable amount of offset current into the current proportional to the parameters being measured in a voltage-to-current converter.

In the prior art, voltage-to-current converters have been employed in order to drive a recorder from a voltage appearing across an impedance in the output of instruments such as pH meters and non-dispersive infrared spectrophotometers, for example. For a large percentage of recorders presently in use, it is necessary to add a fixed offset current to the current which is changed in proportion to the parameter being measured and presented to the recorder. One use of this offset current is to actuate an alarm to indicate a power failure when the offset current disappears. In the prior art this has been accomplished by applying an offset voltage to the circuit at the input, for example, to achieve what is known as a "live zero" to provide an indication that the system is operational.

It is the principal object of the invention to provide a new and improved universal instrument output circuit for adding a known controllable amount of offset current to a current proportional to a parameter being measured in a voltage-to-current converter.

The novel features which are believed to be characteristic of the invention are set forth with particularity in the appended claims. The invention, and further objects and advantages thereof, can best be understood by reference to the following description and accompanying drawing, a schematic diagram of a circuit illustrating one embodiment of the invention.

Turning now to the drawing, the circuit contained therein is referred to as a universal instrument output circuit since most instruments have a voltage output available across an impedance in their output circuits that can drive the circuit, which in turn is designed to drive a recorder and associated circuitry, for example. A typical recorder application requires from four to twenty milliamps of singal current. A constant current source or generator 10 serves to draw a constant current from a terminal 11. The voltage at terminal 11 is proportional to the voltage $E_{in}-e$, where $E_{in}$ is the voltage to be recorded, which is applied across terminals 12 and 13 which are connected in turn to one input of an operational amplifier 14 and to ground bus 15, and $e$ is the error voltage derived by connecting a feedback connection to the other input 16 of the amplifier 14.

Transistors 17 and 18 are connected in "Darlington" emitter-follower configuration, with the base input terminal of transistor 17 connected from the output of operational amplifier 14 and the emitter output terminal of transihtor 18 connected to the terminal 11. The emitter of transistor 17 is connected to the base of transistor 18 and the collectors of transistors 17 and 18 are connected together and over a line 19 through a series circuit including a source of potential 20, which provides the power for the circuit and the recorder, and output terminals 21 and 22 to ground bus 15. A recorder, not illustrated, may be connected across output terminals 21 and 22.

The emitter of transistor 18 is connected from terminal 11 through two feedback divider resistors 23 and 24 in series to ground bus 15, the feedback connection to input 16 being taken from a tap between the resistors 23 and 24. Three proportional load resistors 25, 26 and 27 are connected from the fixed contacts of a three-position switch 28 to the terminal 11. The movable contact 29 of switch 28 is connected to ground bus 15.

The resistor 25, 26 or 27 which is connected in the circuit by the switch 28 will be referred to as R1, the resistor 23 as R2 and the resistor 24 as R3. Since the voltage at terminal 11 is proportional to $E_{in}-e$, assuming the amplifier load at the tap between R2 and R3 to be insignificant, the sum of the currents $I_p$ flowing through R1, $I_{pr}$, $I_m$, and $I_d$ flowing through R2 will be proportional to $E_{in}$. When $E_{in}$ is zero, the voltage at terminal 11 is zero and these currents $I_p$, $I_{pr}$, $I_m$ and $I_d$ are zero. Since the current I coming from the constant current generator 10 to the terminal 11 is constant, it causes essentially no voltage change at the point 11, regardless of the value of $E_{in}$. Thus, $I_c$, the collector current flowing over the line 19 to the recorder, equals $I+I_p+I_d+I_m+I_{pr}$, providing an output current made up of an offset constant current plus a current proportional to the voltage to be measured. The current $I_c$ is equal to the sum of the currents at terminal 11 since the base current $I_b$ of the transistor 17 is negligible.

The constant current generator 10 will be described although it is not considered that the specific circuit therefor is required by the invention as any well-known constant current generator will suffice. Transistors 30 and 31 are connected as a Darlington emitter-follower circuit with their collectors connected together to the terminal 11, the emitter of transistor 30 connected to the base of transistor 31 and the emitter of the transistor 31 connected to a terminal 32. A reference potential is provided by connecting Zener diode 33 from terminal 34 through a resistor 35 to ground bus 15. A negative potential, such as −15 volts, can be applied to the terminal 34 with the diode 33 developing 6.6 volts across its extremities, for example. Two fixed resistors 36 and 37 are connected in series with a potentiometer 38 across diode 33. The wiper on potentiometer 38 is connected to provide a reference potential to the base of a transistor 39, which together with transistor 40 forms a differential amplifier. The collectors of transistors 39 and 40 are connected through resistors 41 and 42, respectively, to ground bus 15. The emitters of transistors 39 and 40 are connected together and through a resistor 43 to terminal 34. The collector of transistor 40 is also connected to the base of transistor 30. Three resistors 44, 45 and 46 are connected between the terminal 32 and the fixed contacts of a three-position switch 47, which has its movable contact 48 mechanically ganged with the movable contact 29 of switch 28 and electrically connected to the terminal 34. The movable contact on potentiometer 38 is set to develop a voltage of 5 volts across the terminals 32 and 34 by establishing the reference level on transistor 39 to provide the appropriate control for transistor 40 in the well-known manner of operation of a differential amplifier connected as a voltage regulator.

A meter 49 is connected in series with a resistor 50 from terminal 11 to ground bus 15 to give an indication of the signal magnitude to the recorder in percentage of full-scale. This branch draws the meter current $I_m$. Series resistors 51–54 are connected from terminal 11 to bus 15 and provided with intermediate taps 55–57 in order to provide the proper scaling to mate with different potentiometric recorders. This branch draws the potentiometric recorder current $I_{pr}$.

The resistor 44 may be 5000 ohms, for example, in which case, with 5 volts across it, it will draw a current of 1 milliamp; the resistor 45 may be 1250 ohms, for example, in order to draw 4 milliamps and the resistor 46 may be 500 ohms to draw 10 milliamps. One of these currents, depending upon the position of the movable contact 48, will flow through the transistor 31 and provide substantially the entire constant current to the terminal 11 since the base current of the transistor 30 is negligible. The ganging of switches 28 and 47 will assure that for the current I selected by switch 47, the resistor R1 selected by switch 28, shunting resistors R2 and R3, meter 49 and series resistor 50, and series resistors 51–54, will have the proper value so that when the offset current associated with each load resistor 25–27 is established, the total current $I_c$ will provide a full-scale reading on the recorder for full scale $E_{in}$.

The circuit illustrated has the advantage of pre-calibration of the constant current I. A true constant current is added into the output circuit to the recorder. Because of the power handling capability of transistor 18, it is effectively short-circuit proof as far as the recorder is concerned. Since the impedance in series with the recorder impedance is on the order of 22.5 megohms, for example, the recorder can vary over its normal range from short circuit or zero ohms to 700 ohms with negligible current change. Also, it is not necessary to compensate for the temperature coefficient of the recorder input because the impedance of the recorder is insignificant. The current measuring device can be located anyplace in the high impedance collector circuit of the transistors 17 and 18 because $I_b$, the base current of transistors 17, approaches zero such that $I_c = I + I_p + I_d + I_m + I_{pr}$, the desired result.

The following table of values will serve, together with the figures already used as examples in the specification, in constructing one embodiment of the invention.

| | |
|---|---|
| Amplifier 14 | Union Carbide H6010, available from Union Carbide Electronics Division, Mount View, Calif. |
| Transistor 17 | 2N3568. |
| Transistor 18 | 2N3919. |
| Transistor 30 | 2N3565. |
| Transistor 31 | 2N3053. |
| Transistor 39 | ⎱ 2N2917 differential pair. |
| Transistor 40 | ⎰ |
| Diode 33 | MCR2525. |
| Resistor 23 | 40,000 ohms. |
| Resistor 24 | 10,000 ohms. |
| Resistor 25 | 1754.4 ohms. |
| Resistor 26 | 336.7 ohms. |
| Resistor 27 | 128.7 ohms. |
| Resistor 35 | 1650 ohms. |
| Resistor 36 | 8760 ohms. |
| Resistor 37 | 40,200 ohms. |
| Resistor 41 | 91,000 ohms. |
| Resistor 42 | 91,000 ohms. |
| Resistor 43 | 22,000 ohms. |
| Resistor 50 | 99,000 ohms. |
| The sum of resistors 51–54 | 5,000 ohms. |
| Meter 49 | 1,000 ohms. |
| Potentiometer 38 | 10,000 ohms. |
| Battery 20 | 40 volts. |

The above values of resistors 23 and 24 have been selected for a full-scale deflection of the recorder when $E_{in} = 1$ volt, in which case the 5 volts across resistors 23 and 24 will be distributed such that the feedback to terminal 16 is also 1 volt.

What is claimed is:

1. A universal instrument output circuit adapted for converting a voltage across an impedance in the output circuit of an instrument to a current for driving a load comprising:
   an operational amplifier having said voltage applied between an input terminal and common;
   an emitter-follower circuit having base and emitter input terminals and collector and emitter output terminals;
   means connecting said load in series with said collector emitter output terminals to common;
   means connecting an output terminal of said amplifier to said base input terminal;
   an impedance feedback divider connected from said emitter output terminal to common and having an intermediate tap connected to an input terminal of said amplifier;
   a constant current source connected from said emitter output terminal to common; and,
   a proportional load resistor connected from said emitter output terminal to common, said proportional load resistor and feedback divider being proportioned to draw full load current together with said source when maximum input voltage is applied to said amplifier and said tap being located to feed back a voltage equal to the entire input voltage.

2. The circuit of claim 1 in which said emitter-follower circuit is a Darlington emitter-follower circuit.

3. The input of claim 1 in which said constant current source includes a first switching circuit for selecting one of a plurality of different magnitudes of constant current; and,
   a second switching circuit ganged with said first switching circuit to connect one of a plurality of proportional load resistors proportioned to adjust the scale factor.

4. The circuit of claim 1 in which a meter is connected in series with a resistor from the emitter output terminal to common.

5. The circuit of claim 1 in which a plurality of series resistors are connected from the emitter output terminal to common to provide a potentiometric output.

References Cited

UNITED STATES PATENTS 3,370,222   2/1968   Haagen-Smit et al. _____ 323—4

JOHN F. COUCH, *Primary Examiner.*

A. D. PELLINEN, *Assistant Examiner.*

U.S. Cl. X.R.

323—16: 324—30